(12) United States Patent
Moeller et al.

(10) Patent No.: US 12,429,463 B2
(45) Date of Patent: Sep. 30, 2025

(54) FITTING FOR FLUIDIC COUPLING IN A CHROMATOGRAPHY SYSTEM

(71) Applicant: Waters Technologies Corporation, Milford, MA (US)

(72) Inventors: Mark W. Moeller, Norton, MA (US); William B. Clark, North Attleboro, MA (US); Charles T. Murphy, Norton, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 18/481,380

(22) Filed: Oct. 5, 2023

(65) Prior Publication Data

US 2024/0027408 A1  Jan. 25, 2024

Related U.S. Application Data

(63) Continuation of application No. 16/991,687, filed on Aug. 12, 2020, now Pat. No. 11,782,032.

(60) Provisional application No. 62/886,375, filed on Aug. 14, 2019.

(51) Int. Cl.
*G01N 30/60* (2006.01)
*F16L 19/02* (2006.01)

(52) U.S. Cl.
CPC ...... *G01N 30/6026* (2013.01); *F16L 19/0206* (2013.01); *F16L 19/0212* (2013.01)

(58) Field of Classification Search
CPC .......... G01N 30/6026; G01N 30/6034; G01N 30/6039; F16L 19/0206; F16L 19/0212
See application file for complete search history.

(56) References Cited

U.S. PATENT DOCUMENTS

| | | |
|---|---|---|
| 2,812,959 A | 11/1957 | Fuller |
| 3,141,686 A | 7/1964 | T. L. |
| 3,582,115 A | 6/1971 | Clague |
| 4,281,679 A | 8/1981 | Stearns |
| 4,619,473 A | 10/1986 | Someya |
| 4,690,437 A | 9/1987 | Anderson, Jr. |
| 4,865,363 A | 9/1989 | Takahashi |
| 5,423,581 A | 6/1995 | Salyers |
| 5,651,886 A | 7/1997 | Hoffmann et al. |
| 5,669,637 A | 9/1997 | Chitty et al. |
| 6,095,572 A | 8/2000 | Ford et al. |
| 6,273,478 B1 | 8/2001 | Benett et al. |

(Continued)

FOREIGN PATENT DOCUMENTS

| | | |
|---|---|---|
| CN | 101960200 A | 1/2011 |
| CN | 102239408 A | 11/2011 |

(Continued)

OTHER PUBLICATIONS

International Search Report and Written Opinion in PCT/US2020/045940 mailed on Jan. 18, 2021.

(Continued)

*Primary Examiner* — Zachary T Dragicevich
(74) *Attorney, Agent, or Firm* — Schmeiser, Olsen & Watts LLP; Victor J. Baranowski, Esq.

(57) ABSTRACT

A method of manufacturing a fitting for fluidic coupling in a chromatography system includes welding a tube sleeve and an inner tube at an endface of each of the tube sleeve and the inner tube to create a tube assembly having a welded tube assembly endface and polishing the welded tube assembly endface.

20 Claims, 8 Drawing Sheets

(56) References Cited

U.S. PATENT DOCUMENTS

| | | |
|---|---|---|
| 6,923,792 B2 | 8/2005 | Staid et al. |
| 7,025,360 B2 | 4/2006 | Walker et al. |
| 7,467,799 B1 | 12/2008 | Tarlton |
| 8,201,854 B2 | 6/2012 | Ford et al. |
| 8,569,070 B2 | 10/2013 | Ellis et al. |
| 9,151,734 B2 | 10/2015 | Ellis et al. |
| 9,212,747 B2 | 12/2015 | Wagner et al. |
| 9,267,630 B2 | 2/2016 | Dehmer |
| 9,334,989 B2 | 5/2016 | Jencks et al. |
| 9,482,649 B2 | 11/2016 | Lueth et al. |
| 9,494,563 B2 | 11/2016 | Falk-Jordan |
| 9,562,879 B2 | 2/2017 | Hirmer et al. |
| 9,751,085 B2 | 9/2017 | Pa |
| 9,764,323 B2 | 9/2017 | Bunner et al. |
| 9,803,782 B2 | 10/2017 | Dehmer |
| 9,804,134 B2 | 10/2017 | Burger et al. |
| 9,950,278 B1 | 4/2018 | Zelechonok |
| 9,982,820 B2 | 5/2018 | Haeckel |
| 10,018,604 B2 | 7/2018 | Burger et al. |
| 10,060,560 B2 | 8/2018 | Belanger et al. |
| 10,067,102 B2 | 9/2018 | Hochgraeber et al. |
| 2004/0239113 A1 | 12/2004 | Hefele et al. |
| 2006/0060515 A1 | 3/2006 | Benevides et al. |
| 2006/0113794 A1 | 6/2006 | Plant et al. |
| 2007/0029791 A1 | 2/2007 | Haertl |
| 2007/0175809 A1 | 8/2007 | Cao et al. |
| 2008/0237112 A1 | 10/2008 | Ford et al. |
| 2009/0295156 A1 | 12/2009 | Ford et al. |
| 2010/0224543 A1 | 9/2010 | Ellis et al. |
| 2011/0298210 A1 | 12/2011 | Hochgraeber et al. |
| 2011/0303593 A1 | 12/2011 | Reinhardt |
| 2012/0061955 A1 | 3/2012 | Hochgraeber et al. |
| 2013/0043677 A1 | 2/2013 | Gibson |
| 2014/0053639 A1 | 2/2014 | DellaRovere et al. |
| 2014/0150923 A1 | 6/2014 | Stalder et al. |
| 2015/0233503 A1 | 8/2015 | Reinhardt et al. |
| 2015/0300542 A1 | 10/2015 | Graham et al. |
| 2015/0369403 A1 | 12/2015 | Cormier et al. |
| 2016/0305586 A1 | 10/2016 | Graham et al. |
| 2017/0122918 A1 | 5/2017 | Wachinger et al. |
| 2017/0153212 A1 | 6/2017 | Cormier et al. |
| 2017/0356575 A1 | 12/2017 | Buerger et al. |
| 2018/0161697 A1 | 6/2018 | Liu et al. |
| 2019/0091693 A1 | 3/2019 | Hirmer et al. |
| 2019/0176054 A1 | 6/2019 | Buerger et al. |
| 2019/0186670 A1 | 6/2019 | Jencks et al. |

FOREIGN PATENT DOCUMENTS

| | | |
|---|---|---|
| CN | 102439437 A | 5/2012 |
| CN | 102537563 A | 7/2012 |
| CN | 103026221 A | 4/2013 |
| CN | 103748396 A | 4/2014 |
| CN | 103807530 A | 5/2014 |
| CN | 103823002 A | 5/2014 |
| CN | 110036291 A | 7/2019 |
| DE | 9320084 U1 | 4/1995 |
| DE | 19755233 C1 | 4/1999 |
| DE | 102011082470 A1 | 3/2013 |
| DE | 102014101759 A1 | 8/2015 |
| EP | 3163298 A2 | 5/2017 |
| GB | 2184186 A | 6/1987 |
| GB | 2264543 A | 9/1993 |
| WO | 9423234 A1 | 10/1994 |
| WO | 9745666 A1 | 12/1997 |
| WO | 9936722 A1 | 7/1999 |
| WO | 0173338 A1 | 10/2001 |
| WO | 2009088663 A1 | 7/2009 |
| WO | 2010102225 A1 | 9/2010 |
| WO | 2010133192 A1 | 11/2010 |
| WO | 2011076244 A1 | 6/2011 |
| WO | 2012160033 A1 | 11/2012 |
| WO | 2013173843 A1 | 11/2013 |
| WO | 2013174421 A1 | 11/2013 |
| WO | 2014099777 A1 | 6/2014 |
| WO | 2016065334 A1 | 4/2016 |
| WO | 2017194193 A1 | 11/2017 |

OTHER PUBLICATIONS

International Preliminary Report on Patentability in PCT/US2020/045940 mailed on Feburary 24, 2022.

International Search Report and the Written Opinion in related PCT Patent Application No. PCT/US2020/023343 dated Jul. 6, 2020. 17 pages.

Invitation to Pay Additional Fees and, Where Applicable, Protest Fee in corresponding PCT Patent Application No. PCT/US2020/045940 dated Nov. 9, 2020. 15 pages.

Final Office Action in U.S. Appl. No. 16/991,687 mailed on Mar. 16, 2023.

Non-Final Office Action in U.S. Appl. No. 16/991,687 mailed on Aug. 10, 2022.

Non-Final Office Action in U.S. Appl. No. 16/991,687 mailed on Nov. 18, 2022.

Restriction Requirement in U.S. Appl. No. 16/991,687 mailed on Jul. 8, 2022.

Notice of Allowance in U.S. Appl. No. 16/991,687 mailed on Jun. 6, 2023.

Final Office Action in U.S. Appl. No. 16/822,769 mailed on Dec. 23, 2022.

International Preliminary Report on Patentability in International Patent Application No. PCT/US2020/023343 mailed on Sep. 30, 2021.

Non-Final Office Action in U.S. Appl. No. 16/822,769 mailed on Sep. 7, 2022.

Non-Final Office Action in U.S. Appl. No. 16/822,769 mailed on Mar. 20, 2023.

Notice of Allowance in U.S. Appl. No. 16/822,769 mailed on Nov. 1, 2023.

Fu, Xuemin, "Improving and sealing support structure to increase life of high-speed hydraulic rotary joints" Textile Science and Technology Progress, Issue 05, Oct. 30, 2004.

Liu, et al. "Common sealing forms of pipe joints in hydraulic system of enginering machinery" Engineering Machinery and Maintenance, Issue 10, Oct. 10, 2017.

Examination Report in European patent application No. 20718980.4 mailed on Mar. 18, 2024.

Extended European Search Report in EP Application No. 24218891.0 mailed on May 15, 2025.

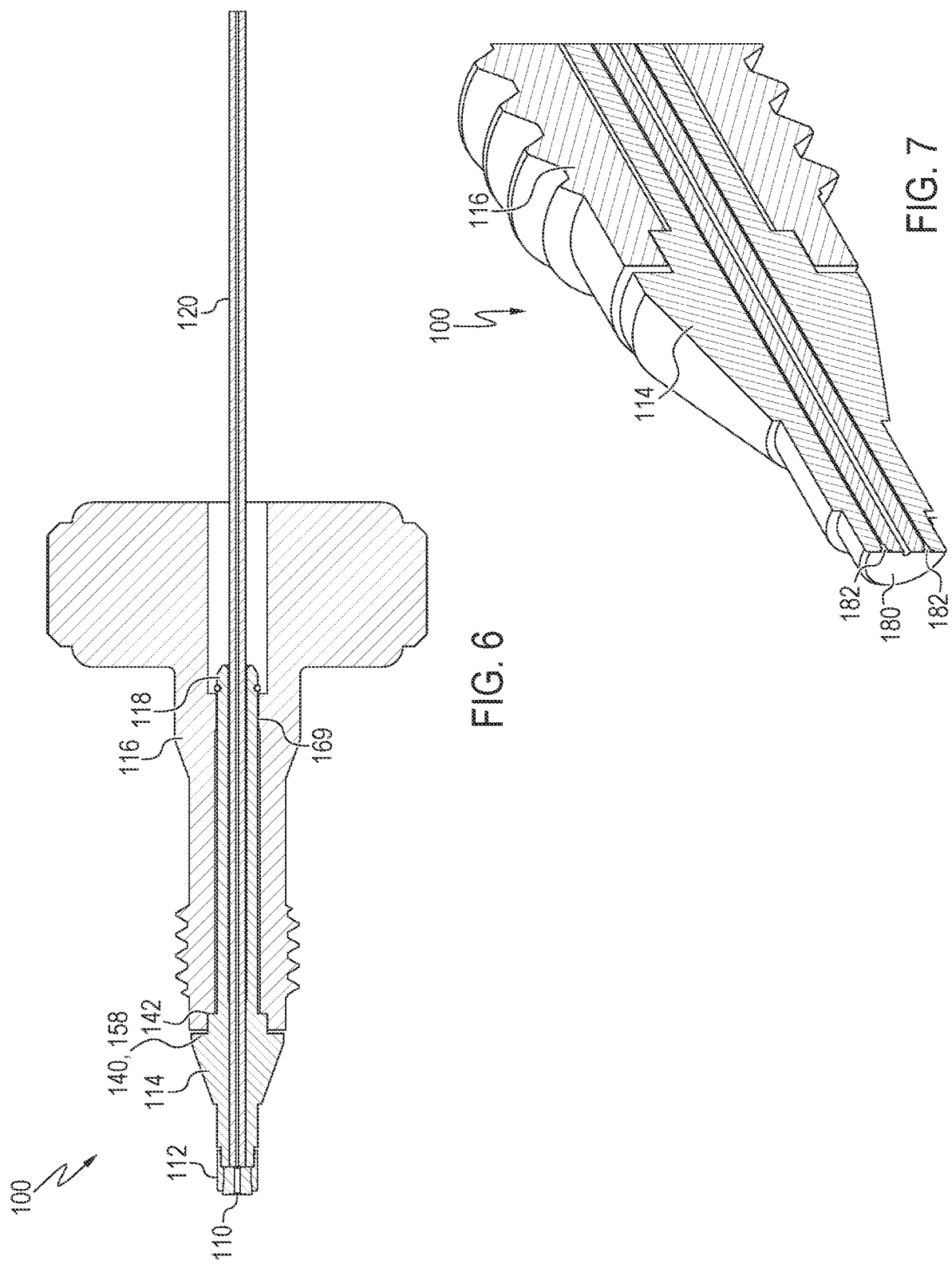

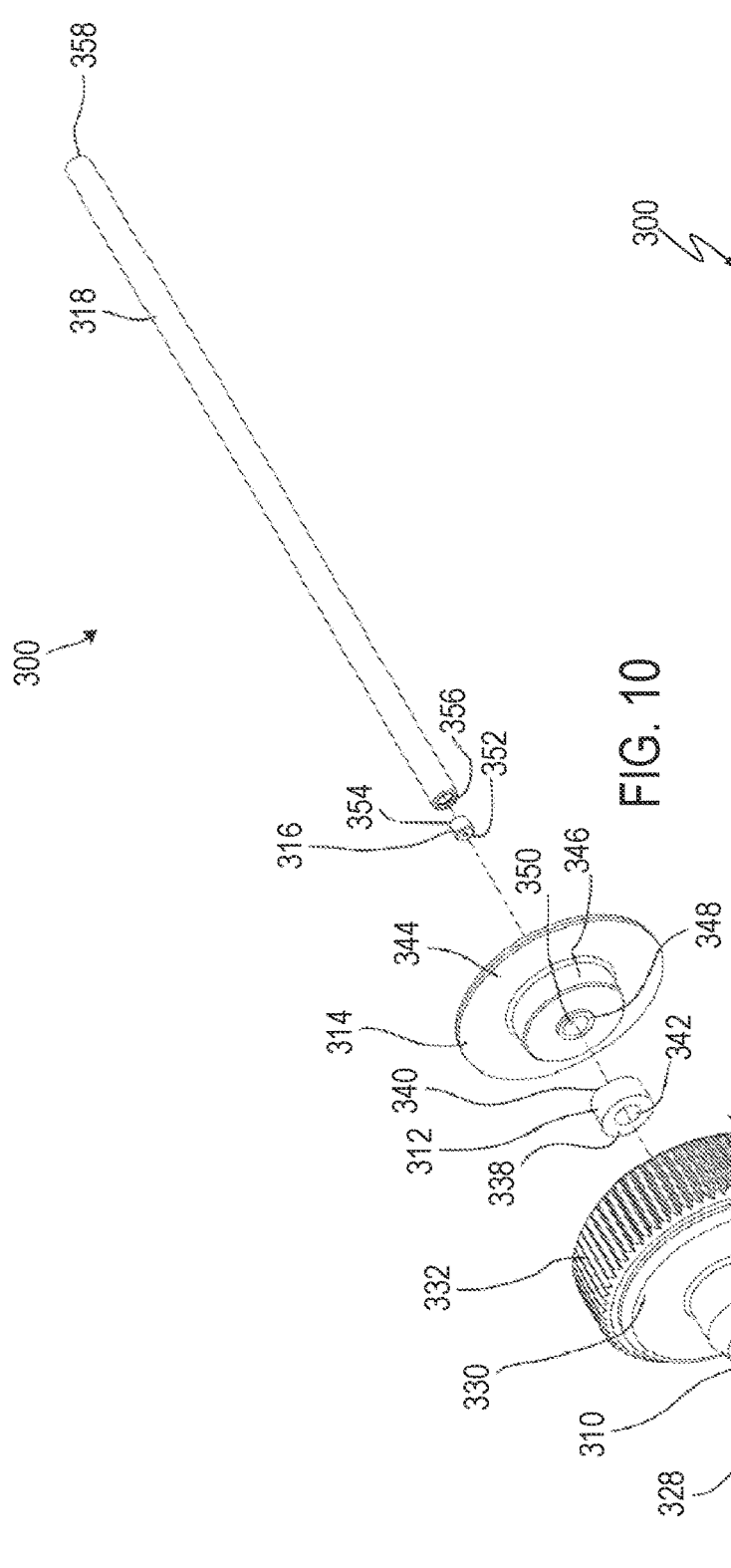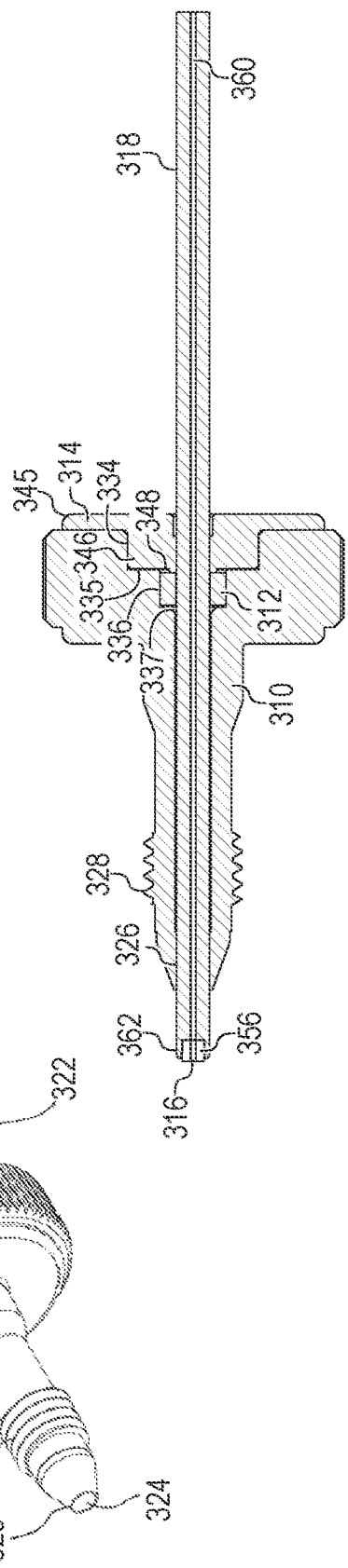

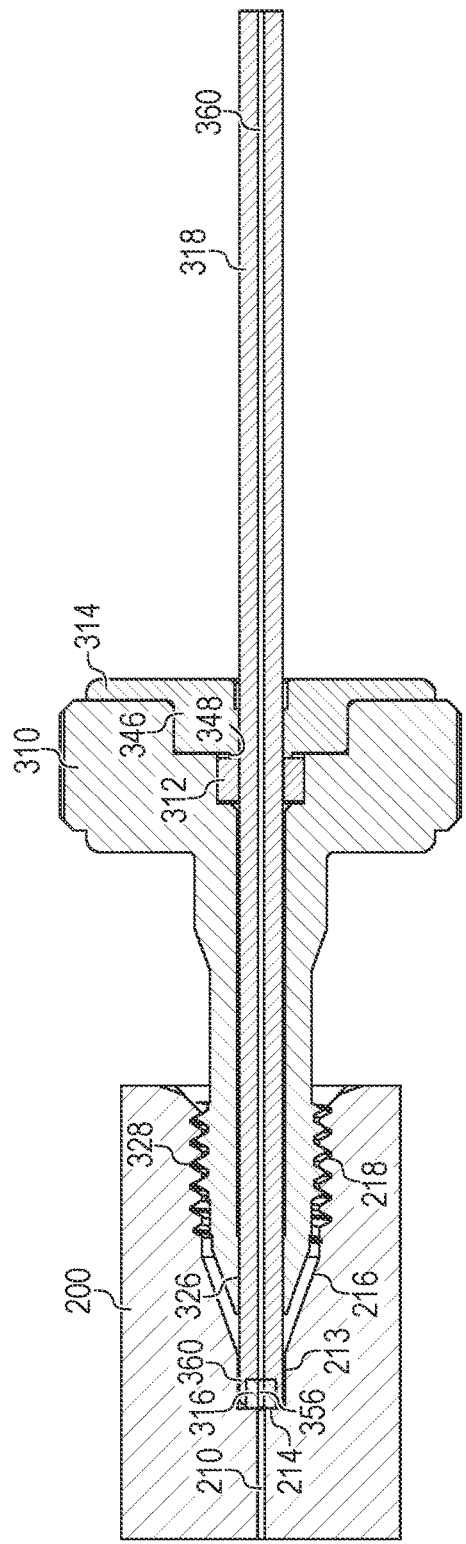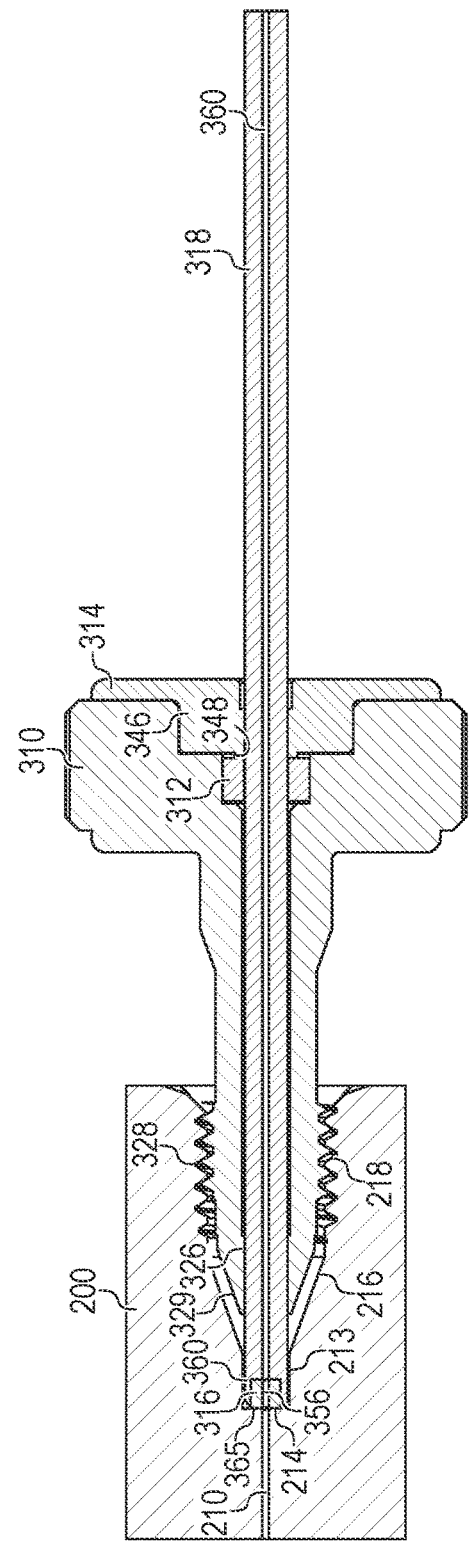

FITTING FOR FLUIDIC COUPLING IN A CHROMATOGRAPHY SYSTEM

RELATED APPLICATION

This application is a continuation of U.S. patent application Ser. No. 16/991,687 filed on Aug. 12, 2020, now U.S. Pat. No. 11,782,032 and titled "Fitting For Fluidic Coupling in a Chromatography System," which claims the benefit of the earlier filing date of U.S. Provisional Patent Application Ser. No. 62/886,375 filed Aug. 14, 2019 and titled "Fitting For Fluidic Coupling in a Chromatography System," the entireties of which are incorporated herein by reference.

FIELD OF THE INVENTION

The invention relates generally to chromatography. More particularly, the invention relates to fittings for fluidic coupling for use in chromatography systems.

BACKGROUND

Chromatography is a set of techniques for separating a mixture into its constituents. Well-established separation technologies include HPLC (High Performance Liquid Chromatography), UPLC (Ultra Performance Liquid Chromatography) and SFC (Supercritical Fluid Chromatography). HPLC systems use high pressure, ranging traditionally between 1,000 psi (pounds per square inch) to approximately 6,000 psi, to generate the flow required for liquid chromatography (LC) in packed columns. Compared to HPLC, UPLC systems use columns with smaller particulate matter and higher pressures approaching 20,000 psi to deliver the mobile phase. SFC systems use highly compressible mobile phases, which typically employ carbon dioxide ($CO_2$) as a principle component.

In a typical LC system, a solvent delivery system takes in and delivers a mixture of liquid solvents to an injection system where an injected sample awaits the arrival of this mobile phase. The mobile phase carries the sample through a separating column. In the column, the mixture of the sample and mobile phase divides into bands depending upon the interaction of the mixture with the stationary phase in the column. A detector identifies and quantifies these bands as they exit the column.

Typical fluidic tube fittings for fluidic coupling in LC systems require an open-ended wrench for installation. This can cause issues during installation. If a wrench is unavailable, a user will not be able to apply enough torque for the fitting to properly tighten. Even if a wrench is available, using a tool such as a wrench for installation of a fitting can be difficult for some users and result in over-tightened or under-tightened installations.

Still further, typical tube fittings for fluidic coupling in LC systems often create debris from galling between a compression screw and a gasket and/or ferrule. Galling and debris reduces the life of the fitting. Other issues encountered in fittings are that many fittings allow for dead volume to exist between the fitting and a female receiver of a fluidic coupling. This dead space allows for liquid to accumulate without being moved through the fitting and hinders the accuracy of the system. Existing fitting systems also include many loose parts, which can create problems for users if parts are lost or dropped.

Thus, an improved fitting for fluidic coupling in an LC system would be well received in the art.

SUMMARY

In one exemplary embodiment, a fitting for fluidic coupling in a chromatography system includes a compression screw including an axial bore, a threaded portion, and a drive end; a tube assembly including a tube sleeve and an inner tube disposed through the sleeve, the tube sleeve and the inner tube each extending to an endface of the tube assembly, the tube sleeve including an outer surface; a seal body extending between a first endface and a second endface, the first endface abutting the endface of the tube assembly, the seal body including an outer surface; and a collar secured to the outer surface of the tube sleeve and the outer surface of the seal body.

Additionally or alternatively, the tube sleeve and the inner tube are welded together at the endface.

Additionally or alternatively, the endface is a polished surface.

Additionally or alternatively, seal body is made of at least one of a high temperature polyimide and polyether ether ketone.

Additionally or alternatively, the collar includes a thin wall portion extending from a first end, and a thick wall portion extending from the thin wall portion to a second end, wherein a circumferential interior ridge is defined by a difference in thickness between the thin wall portion and the thick wall portion, wherein the circumferential interior ridge defines a surface that contacts the endface of the tube assembly.

Additionally or alternatively, the tube sleeve includes a reduced outer diameter portion extending from the endface, wherein the thin wall portion of the collar extends over the reduced outer diameter portion of the tube sleeve.

Additionally or alternatively, the thin wall portion of the collar is press fit over the reduced outer diameter portion of the tube sleeve, and wherein the thick wall portion of the collar is press fit over the seal body.

Additionally or alternatively, the compression screw includes a knurled grip portion located at a grip end opposite the drive end, the knurled grip portion configured to facilitate hand tightening of the compression screw into a receiver fitting.

Additionally or alternatively, the compression screw is made of a gall resistant stainless steel material.

Additionally or alternatively, the seal body includes an inner bore having dimensions that are equal or larger than an inner diameter of the inner tube.

Additionally or alternatively, the seal body is configured to deform over the second end when compressed against a surface of a receiver fitting.

Additionally or alternatively, the fitting includes a ring welded to the tube assembly configured to be pushed by the compression screw during tightening.

In another exemplary embodiment, a method of manufacturing a fitting for fluidic coupling in a chromatography system comprises: welding a tube sleeve and an inner tube at an endface of each of the tube sleeve and the inner tube to create a tube assembly having a welded tube assembly endface; and polishing the welded tube assembly endface.

Additionally or alternatively, the method includes abutting a surface of a seal body to the welded tube assembly endface; and securing a collar to an outer surface of the tube sleeve and an outer surface of the seal body.

Additionally or alternatively, the securing the collar further includes press fitting the collar to each of the outer surface of the tube sleeve and the outer surface of the seal body.

Additionally or alternatively, the method includes maintaining a fluid tight seal between the surface of the seal body and the welded tube assembly endface such that fluid conveyed through the inner tube and an axial opening of the seal body does not leak between the tube sleeve, the inner tube, and the collar.

In another exemplary embodiment, a method of fluidic coupling in a chromatography system comprises: providing a fitting including: a compression screw including an axial bore, a threaded portion, and a drive end; a tube assembly including a tube sleeve and an inner tube disposed through the sleeve, the tube sleeve and the inner tube each extending to an endface of the tube assembly, the tube sleeve including an outer surface; a seal body extending between a first endface and a second endface, the first endface abutting the endface of the tube assembly, the seal body including an outer surface; and a collar secured to the outer surface of the tube sleeve and the outer surface of the seal body; and fluidically coupling the fitting to a receiver fitting of a liquid chromatography system by hand tightening the compression screw without a tightening tool.

Additionally or alternatively, the method includes maintaining a fluid tight seal between the first endface of the seal body and the endface of the tube assembly; conveying fluid through the inner tube and an axial opening of the seal body; and avoiding any leaking of the fluid between the tube sleeve, the inner tube, and the collar.

Additionally or alternatively, the method includes deforming the seal body over an end of the collar when compressed against a surface of a receiver fitting.

In another exemplary embodiment, a fluidic coupling in a chromatography system comprises: a fitting for fluidic coupling comprising: a compression screw including an axial bore, a threaded portion, and a drive end; a tube assembly including a tube sleeve and an inner tube disposed through the sleeve, the tube sleeve and the inner tube each extending to an endface of the tube assembly, the tube sleeve including an outer surface; a seal body extending between a first endface and a second endface, the first endface abutting the endface of the tube assembly, the seal body including an outer surface; and a collar secured to the outer surface of the tube sleeve and the outer surface of the seal body; and a receiver fitting having a threaded bore and an inner bore having a sealing surface at an end opposite the threaded bore, the receiver fitting having a channel extending from the sealing surface to pass a fluid.

Additionally or alternatively, the threaded portion of the compression screw is engaged with the threaded bore of the receiver fitting pushing the second endface of the seal body against the sealing surface of the receiver fitting.

Additionally or alternatively, the seal body creates a fluid tight seal between the outer surface of the seal body and the tube assembly endface such that fluid conveyed through the inner tube and an axial opening of the seal body does not leak between the tube sleeve, the inner tube, and the collar.

In another exemplary embodiment, a fitting for fluidic coupling in a chromatography system comprises: a compression screw including an axial bore, a threaded portion, and a drive end; a tube having body and a greater diameter portion configured to be moved axially with the compressions screw, the tube including a counterbore extending from a front end to a seating surface; and a seal body extending between a first endface and a second endface, the first endface abutting the seating surface of the counterbore, the seal body including an outer surface dimensioned to fit within the counterbore.

Additionally or alternatively, the compression screw includes a back end opposite the drive end and at least one counterbore extending from the back end.

Additionally or alternatively, the at least one counterbore comprises a first counterbore extending to a first seating surface, and a second counterbore extending from the first seating surface to a second seating surface, wherein the greater diameter portion is a ring welded to a body of the tube, the ring dimensioned to fit into the second counterbore.

Additionally or alternatively, the fitting includes a retainer cap attached to the back end of the compression screw, the retainer cap dimensioned to be attached within the first counterbore with a press fit between the retainer cap and the first counterbore, the retainer cap configured to contact the ring to drive the tube forward with the compression screw during compression by the compression screw.

Additionally or alternatively, the retainer cap and the compression screw are configured to rotate about the tube and the ring during tightening of the compression screw in a receiver fitting.

Additionally or alternatively, the seal body is made of at least one of a high temperature polyimide and polyether ether ketone.

Additionally or alternatively, the counterbore includes a narrow wall portion axially extending from the seating surface toward the front end, the narrow wall portion configured to receive the first endface of the seal body in a press fit.

Additionally or alternatively, the seal body extends between the first endface and the second endface a length that is greater than an axial length of the at least one counterbore.

Additionally or alternatively, the seal body is configured to deform over the front end of the tube body when compressed against a surface of a receiver fitting.

Additionally or alternatively, the seal body includes an inner bore having dimensions that are equal or larger than an inner diameter of the tube body.

Additionally or alternatively, the compression screw includes a knurled grip portion located at a back end opposite the drive end, the knurled grip portion configured to facilitate hand tightening of the compression screw into a receiver fitting.

Additionally or alternatively, the compression screw is made of a gall resistant stainless steel material.

In another exemplary embodiment, a method of fluidic coupling in a chromatography system comprises: providing a fitting including: a compression screw including an axial bore, a threaded portion, and a drive end; a tube having body and a greater diameter portion configured to be moved axially with the compressions screw, the tube including a counterbore extending from a front end to a seating surface; a seal body extending between a first endface and a second endface, the first endface abutting the seating surface of the counterbore, the seal body including an outer surface dimensioned to fit within the counterbore; and fluidically coupling the fitting to a receiver fitting of a liquid chromatography system by hand tightening the compression screw without a tightening tool.

Additionally or alternatively, the method includes maintaining a fluid tight seal between the first endface of the seal body and the seating surface of the tube assembly; and conveying fluid through the tube and an axial opening of the seal.

Additionally or alternatively, the method includes deforming the seal body over the front end of the tube when compressed against a surface of a receiver fitting.

In another exemplary embodiment, a fluidic coupling in a chromatography system comprises: a fitting for fluidic coupling in a chromatography system comprising: a compression screw including an axial bore, a threaded portion, and a drive end; a tube having body and a greater diameter portion configured to be moved axially with the compressions screw, the tube including a counterbore extending from a front end to a seating surface; and a seal body extending between a first endface and a second endface, the first endface abutting the seating surface of the counterbore, the seal body including an outer surface dimensioned to fit within the counterbore; and a receiver fitting having a threaded bore and an inner bore having a sealing surface at an end opposite the threaded bore, the receiver fitting having a channel extending from the sealing surface to pass a fluid.

Additionally or alternatively, the threaded portion of the compression screw is engaged with the threaded bore of the receiver fitting pushing the second endface of the seal body against the sealing surface of the receiver fitting.

Additionally or alternatively, the seal body creates a fluid tight seal between the first endface of the seal body and the seating surface of the counterbore and between the second endface of the seal body and the sealing surface of the inner bore such that fluid conveyed through a channel of the tube and an axial opening of the seal body does not leak from the channel of the tube and the axial opening of the seal body.

Additionally or alternatively, the seal body extends between the first endface and the second endface a length that is greater than an axial length of the at least one counterbore.

Additionally or alternatively, the seal body is deformed over the front end of the tube body and compressed against the sealing surface of the receiver fitting.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

FIG. 6 depicts a side cross sectional view of the fitting of FIGS. 4 and 5 in accordance with one embodiment.

FIG. 7 depicts a perspective cutaway view of the fitting of FIGS. 4-6 in accordance with one embodiment.

FIG. 10 depicts an exploded perspective view of another exemplary fitting in accordance with one embodiment.

FIG. 11 depicts a side cross sectional view of the fitting of FIG. 10 in accordance with one embodiment.

FIG. 12 depicts a side cross sectional view of the fitting of FIGS. 10 and 11 attached to a receiver before tightening in accordance with one embodiment.

FIG. 13 depicts a side cross sectional view of the fitting of FIGS. 10-12 attached to a receiver after tightening in accordance with one embodiment.

DETAILED DESCRIPTION

Figure 1:
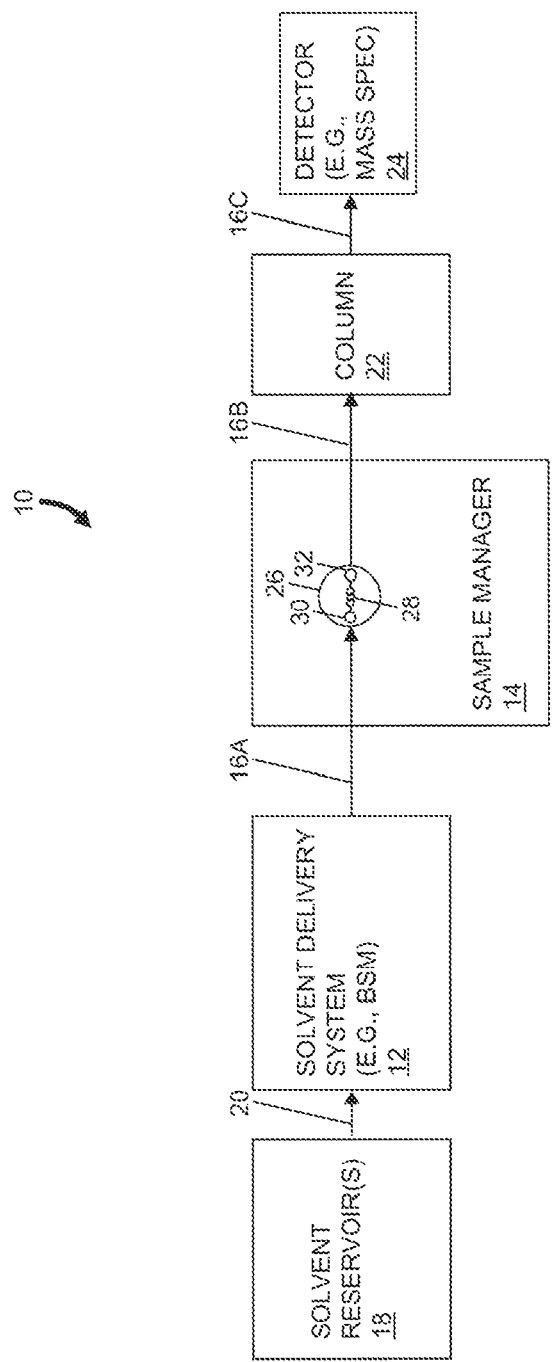
FIG. 1 depicts a block diagram of an embodiment of a liquid chromatography system.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

High pressure fittings used in chromatographic systems typically include a compression member (e.g., a ferrule) and a compression screw to couple a fluid path in a tube to a fluid channel in a structure that includes a receiving port to receive the fitting. Hereinafter a "compression screw" may be a compression nut, or other feature configured to engage with a receiver fitting and compress or push on a fluidic tube into the receiver fitting. During installation, the installer slides the compression screw onto the tube and then slides the ferrule onto the tube before inserting the tube into the receiving port. The compression screw is tightened while the installer maintains a force on the tube to keep the endface of the tube in contact with a sealing surface at the bottom of the receiving port. The installer needs to know the proper installation technique. If installed improperly, or as a result of wear over time, damage can occur at the endface of the tube that is in contact with the sealing surface at the bottom of the receiving port. Further, because the components of the fittings are not fully contained in an assembled state, the components may be misplaced or mishandled prior to or during installation.

In brief overview, the present invention seeks to provide fittings for liquid chromatography systems that are fully contained and without loose parts. Embodiments of fittings disclosed herein are tool-free fittings that eliminate the need for installation tools and can be sufficiently tightened by hand. Further, fittings described herein may be configured to eliminate debris from galling during tightening. Fittings described herein may further be configured to eliminate pinch points within a female receiver fitting and minimize seal creep and further eliminate dead volume. The fittings described herein may be configured for multiple installations and tightening sequences without compromising connection integrity.

FIG. 1 shows an embodiment of a liquid chromatography system 10 for separating a sample into its constituents. The liquid chromatography system 10 can be an HPLC, UPLC, or SFC system. The liquid chromatography system 10 includes a solvent delivery system 12 in fluidic communication with a sample manager 14 (also called an injector or autosampler) through fluidic tube 16A. The solvent delivery system 12 includes pumps (not shown) in fluidic communication with solvent (or fluid) reservoirs 18 from which the pumps draw solvents through a fluidic conduit 20, which may be a fluidic conduit, line, tube or channel. A chromatography column 22 is in fluidic communication with the sample manager 14 through fluidic tube 16B. Fluidic tube 16C couples the output port of the column 22 to a detector 24, for example, a mass spectrometer, a UV detector, or any other detector. Through the fluidic tube 16C, the detector 24 receives the separated components from the column 22 and produces an output from which the identity and quantity of the analytes may be determined. As described herein, at various locations in the liquid chromatography system 10, the fluidic tubes 16A, 16B, 16C are coupled to system components using high pressure fittings. Each fluidic tube 16 refers to a section of tubing rather a single tube. Each tubing section may comprise one tube or multiple tubes joined in series (e.g., by valves, tees, etc.).

The sample manager 14 includes an injector valve 26 with a sample loop 28. The solvent manager 14 operates in one of two states: a load state and an injection state. In the load state, the position of the injector valve 26 is such that the solvent manager 14 loads the sample into the sample loop 28; in the injection state, the position of the injector valve 26 changes so that solvent manager 14 introduces the sample in the sample loop 28 into the continuously flowing mobile phase arriving from the solvent delivery system 12. With the injector valve 26 in the injection state, the mobile phase carries the sample into the column 22. To accomplish this, the mobile phase arrives at the injector valve 26 through an input port 30 and leaves the injector valve with the sample through an output port 32.

Various fittings according to principles of the invention as described below may be present within the liquid chromatography system 10. For example, such fittings may be present where the fluidic tube 16A connects to the input port 30 of the injector valve 26, where the fluidic tube 16B connects to the output port 32 of the injector valve 26 and to the column 22, and where the fluidic tube 16C connects to the output end of the column 22 and to the detector 24.

Figure 2:
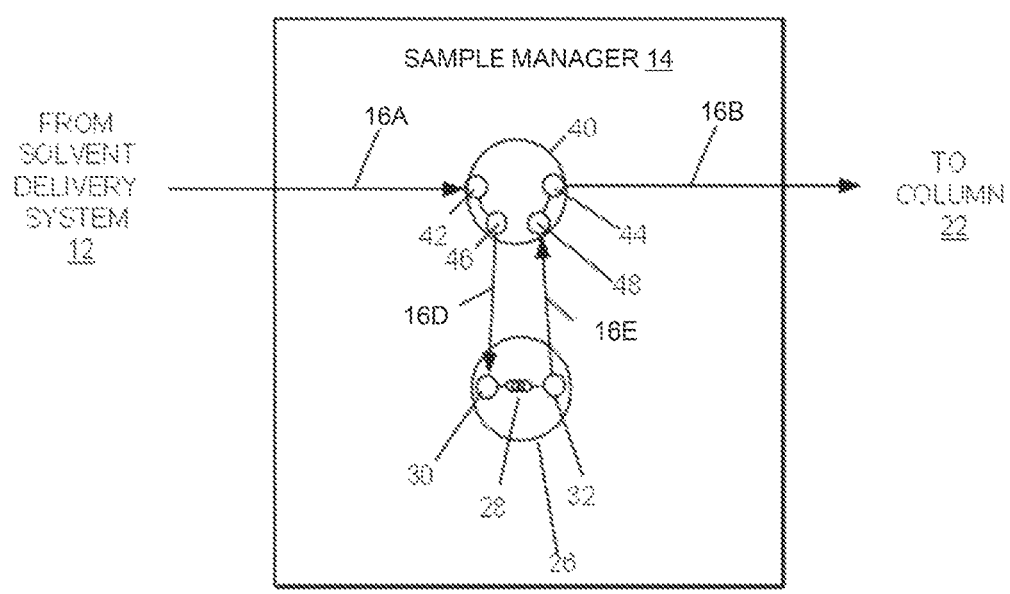
FIG. 2 depicts a functional diagram of an embodiment of a sample manager of the liquid chromatography system of FIG. 1.

As shown in FIG. 2, in some embodiments, for example, those in which the liquid chromatography system 10 is a CO2-based system, the sample manager 14 can further include an auxiliary valve 40 interposed between the solvent delivery system 12 and the injector valve 26 and between the injector valve 26 and the column 22. In general, the auxiliary valve 40 provides a fluidic pathway through which the injector valve 26 may vent. In this embodiment, the fluidic tube 16A couples the solvent delivery system 12 to a first input port 42 of the auxiliary valve 40 and the fluidic tube 16B couples a second output port 44 of the auxiliary valve 40 to the column 22. Fluidic tube 16D and 16E also couple the auxiliary valve 40 to the injector valve 26; fluidic tube 16D connects a first output port 46 of the auxiliary valve 40 to the input port 30 of the injector valve 26, and fluidic tube 16E connects the output port 32 of the injector valve 26 to a second input port 48 of the auxiliary valve 40.

When the valves 26, 40 are configured for sample injection, the arrows on the fluidic tube 16A and 16D show the direction of flow of the mobile phase towards the injector valve 26; those arrows on the fluidic tube 16E and 16B correspond to the flow of the mobile phase carrying the sample from the injector valve 26 towards the column 22.

Like the fluidic tube 16A, 16B, 16C described in connection with FIG. 1, the additional fluidic tube 16D and 16E can also be coupled at their ends with fittings configured according to principles of the invention. More specifically, such fittings may be present where the fluidic tube 16D connects to the first output port 46 of the auxiliary valve 40 and to the input port 30 of the injector valve 26, and where the fluidic tube 16E connects to the output port 32 of the injector valve 26 and to the second input port 48 of the auxiliary valve 40.

Figure 3:
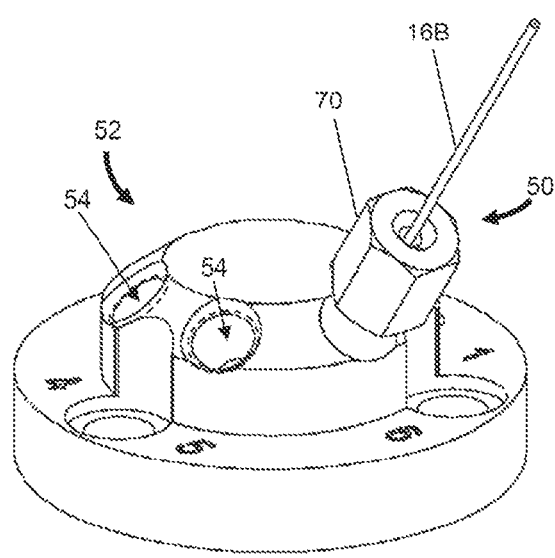
FIG. 3 depicts an illustration of an embodiment of a fluidic coupling of tubing to a stator portion of a rotary shear seal valve through a fitting.

FIG. 3 shows an example of how a fluidic coupling 50 is used to couple the fluidic tube 16B to the stator portion 52 of a rotary shear seal valve through one of the receiving ports 54. Only one fitting connection is shown for clarity although it will be recognized that other fluidic tube 16B may be coupled to other receiving ports 54 of the stator portion 52 in a similar manner. The fluidic tube 16B is shown extending into a compression screw 70. The compression screw 70 may also be described as a compression nut. While the fluidic tube 16B is shown for exemplary purposes in FIG. 3, it should be understood that embodiments of the invention may be incorporated to connect any of the fluidic tubes 16A, 16B, 16C, 16D, 16E (generally 16) and receivers of the liquid chromatography system 10 or any other fluidic system having fluidic fittings.

Figure 4:
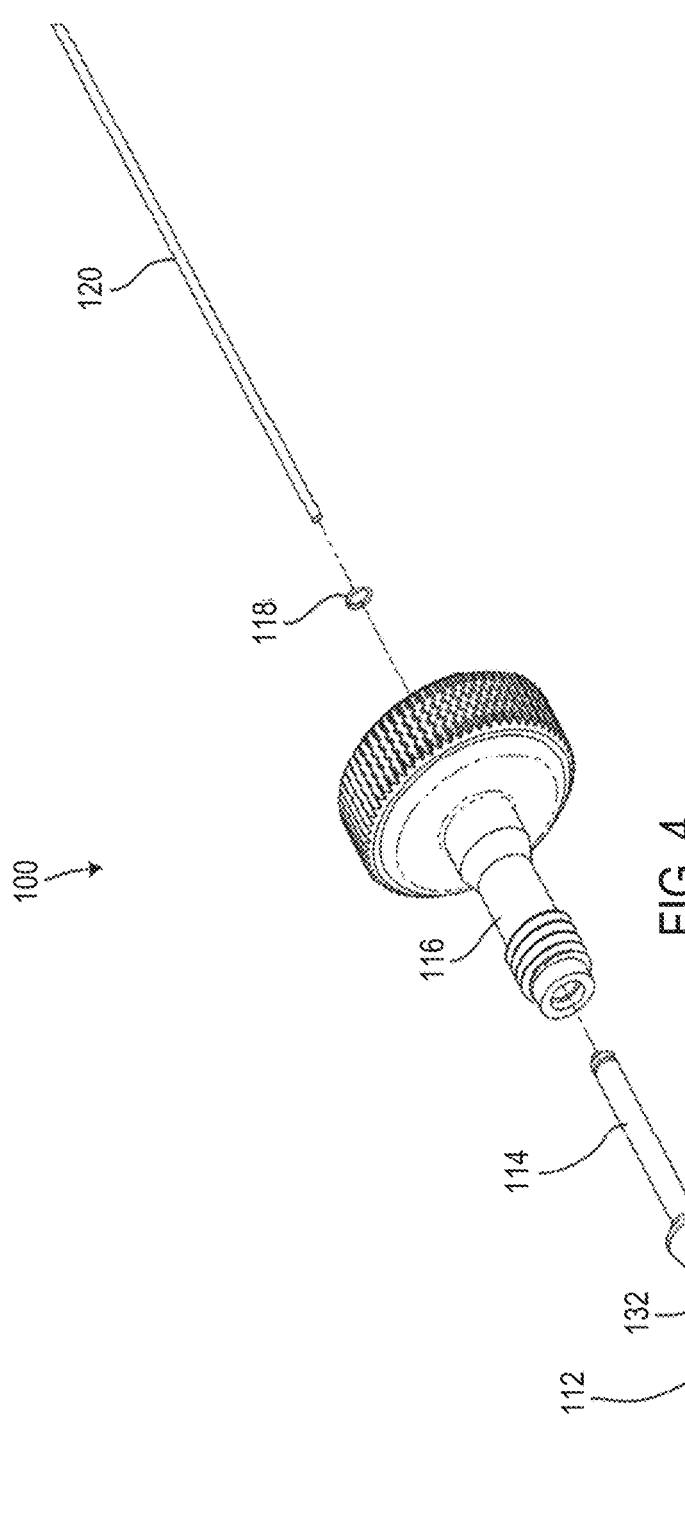
FIG. 4 depicts an exploded perspective view of an exemplary one of the fittings of FIGS. 1-3 in accordance with one embodiment.
Figure 5:
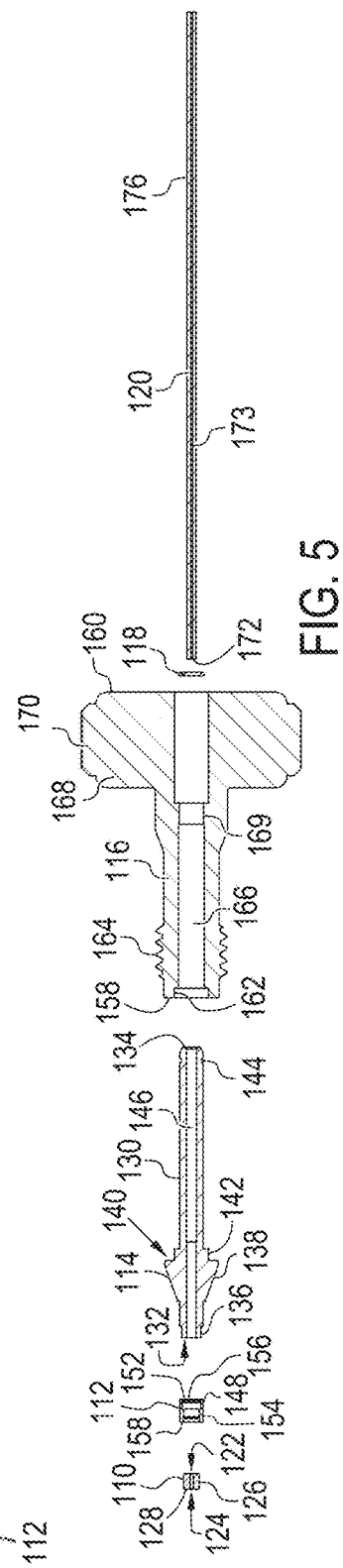
FIG. 5 depicts an exploded side view of the fitting of FIG. 4 in accordance with one embodiment.

FIG. 4 depicts an exploded perspective view of an exemplary one of the fittings 100 of FIGS. 1-3 in accordance with one embodiment. FIG. 5 depicts an exploded side view of the fitting of FIG. 4 in accordance with one embodiment. The fitting 100 may be is configured to connect to various liquid chromatography systems, such as 6 kilopounds per square inch (ksi) systems, 10 ksi systems, and/or 20 ksi systems. The fitting 100 may be configured for use anywhere in the liquid chromatography system 10 such as within pump(s), sample manager(s), column module(s) and/or detector(s) thereof. The fitting 100 may be a tool-free fitting that eliminates the need for installation tools and can be sufficiently tightened by hand. The fitting 100 may be configured to eliminate debris from galling during tightening. The fitting 100 may further be configured to eliminate pinch points within a female receiver fitting and minimize seal creep and further eliminate dead volume. The fitting 100 may be configured for multiple installations and tightening sequences without compromising connection integrity. All of the components of the fitting 100 may remain captive once assembled as described herein, with no loose parts capable of falling off or becoming lost during use.

The fitting 100 is shown including a seal body 110, a collar 112, a tube sleeve 114, a compression screw 116, a retainer ring 118 and an inner tube 120. Hereinafter, the combination of the tube sleeve 114 and the inner tube 120 will be referred to as a tube assembly 114, 120. The fitting 100 is shown with its constituent parts prior to the manufacturing thereof which may include welding, polishing and/or crimping the various components 110, 112, 114, 116, 118, 120 in an assembled state, as described herein below and shown in FIGS. 6-9.

As shown in FIGS. 4 and 5, the seal body 110 of the fitting 100 extends between a first endface 122 and a second endface 124. The seal body 110 includes an outer surface 126 and an inner bore 128. The inner bore 128 of the seal body 110 may include an inner diameter in the range between 0.003 inches and 0.020 inches depending on, for example, the inner diameters of the tube assembly 114, 120 and/or a female receiver fitting or the pressure requirement for a given application. The seal body 110 may be made of, for example, a high temperature polyimide or a polyether ether ketone (PEEK) material. The seal body 110 may further be made of a deformable material that is configured to compress under axial stress. However, in higher pressure applications, the seal body 110 may be made from a metallic material, such as Tantalum or Niobium metal. The yield strength of the material of the seal body 110 may be lower than the yield strength of the material of the components of the tube assembly 114, 120. The seal body 110 may be made of a creep resistant material and the seal body 110 may be, when assembled fully constrained by the collar 112 so as to prevent creep and prevent the need for periodic retightening of the fitting 100.

The fitting 100 further includes the tube sleeve 114. The tube sleeve 114 includes an outer surface 130, and extends between a front endface 132 and a back end 134. Extending within the tube sleeve 114 between the front endface 132 and the back end 134 is an inner channel 146 configured to receive the inner tube 120. The tube sleeve 114 includes a reduced outer diameter portion 136 extending from the front endface 132. The collar 112 is configured to extend over the reduced outer diameter portion 136 when the fitting 100 is assembled, as shown in FIG. 6.

The tube sleeve 114 further includes a conical or tapered surface 138 expanding the outer diameter of the tube sleeve 114. The conical or tapered surface 138 extends to a pushing surface 140 configured to receive an axial load from a surface of the compression screw 116. The pushing surface 140 is a circumferential surface extending perpendicular to the axial direction of the tube sleeve 114 and the fitting 100. The pushing surface 140 extends radially to a circumferential seat portion 142 configured to be received by a respective counterbore of the compression screw 116. The conical or tapered surface 138, the pushing surface 140 and the circumferential seat portion 142 are shown as an integral element of the tube sleeve 114. However, in some embodiments, a tube sleeve 114 having the dimensions shown may be comprised of two or more separate components welded or otherwise attached together.

The tube sleeve 114 extends to the back end 134 where a circumferential channel 144 is located. The circumferential channel 144 may be configured to receive and retain the retainer ring 118 in a fixed position along the axial length of the tube sleeve 114. The tube sleeve 114 may be configured to be welded together with the inner tube 120 so that movement of the tube sleeve 114 imparts movement on the inner tube 120.

The collar 112 is shown that is securable to each of the outer surface 130 of the tube sleeve 114, particular at the reduced outer diameter portion 136, and the outer surface 126 of the seal body 110. The collar 112 extends between a first end 148 and a second end 150. The collar 112 includes a thin wall portion 152 extending from the first end 148 and a thick wall portion 154 extending from the thin wall portion 152 to the second end 150. A circumferential ridge 156 is defined by a difference in thickness between the thin wall portion 152 and the thick wall portion 154. The circumferential ridge 156 defines a surface that is configured to contact the endface of the tube assembly 114, 120, and in particular, the front endface 132 thereof. Each of the thick wall portion 154 and the thin wall portion 152 may be configured to be press fit over the respective seal body 112 and the reduced outer diameter portion 136 of the tube sleeve 114.

The compression screw 116 extends between a pushing endface 158 and a back end 160 and includes a channel 166 extending between the pushing endface 158 and the back end 160. The channel 166 may be configured to receive a back portion of the tube sleeve 114. A reduced diameter portion 168 of the channel 168 may be configured to cooperate with the retainer ring 118 to act as a stopper and prevent the tube assembly 114, 120 from moving axially with respect to the compression screw 116. In particular, the retainer ring 118 may have a larger outer diameter than the reduced diameter portion 168, thereby preventing the retainer ring 118 from moving axially past the reduced diameter portion 168 toward the pushing endface 158.

Figure 8:
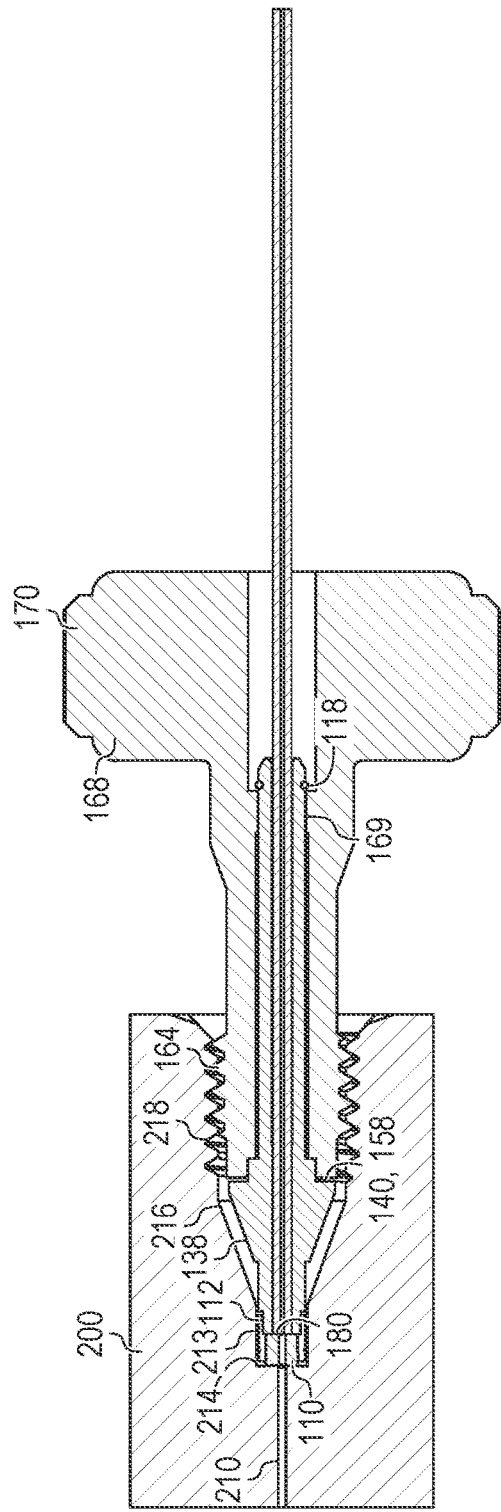
FIG. 8 depicts a side cross sectional view of the fitting of FIGS. 4-7 attached to a receiver before tightening in accordance with one embodiment.
Figure 9:
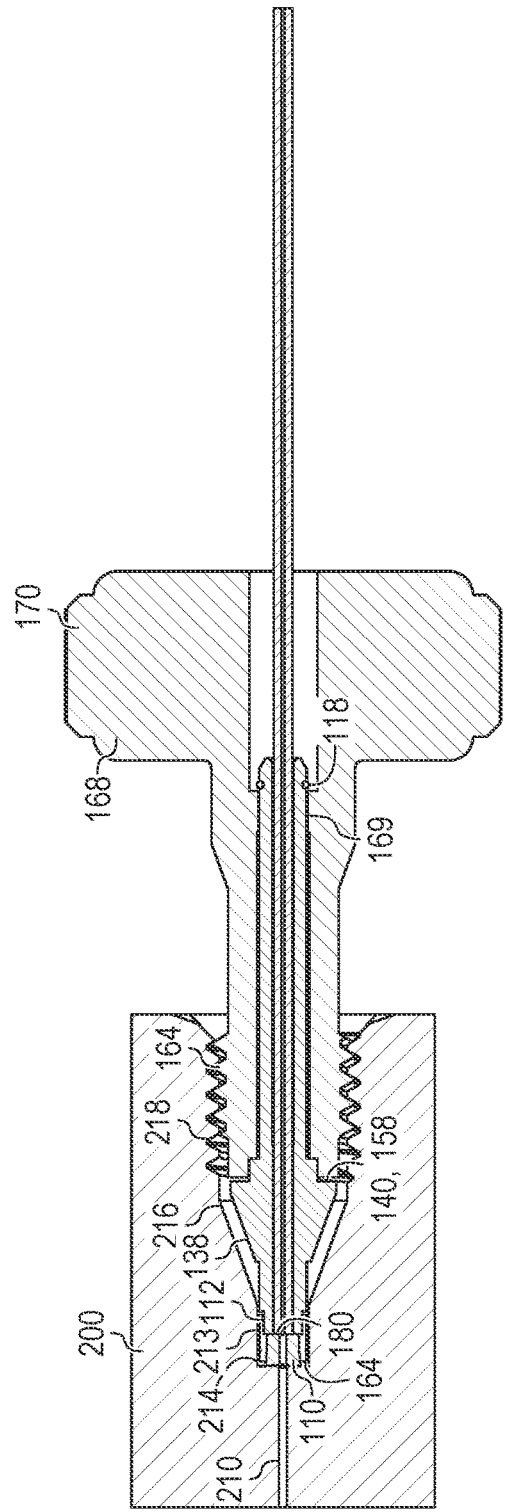
FIG. 9 depicts a side cross sectional view of the fitting of FIGS. 4-7 attached to a receiver after tightening in accordance with one embodiment.

The compression screw 116 may be made of a gall resistant stainless steel material to prevent galling and prevent debris from being created by the friction between the compression screw 116 and a female receiver fitting, as shown in FIGS. 8-9. However, embodiments contemplated may be made of any metallic material. Materials that are not gall resistant are also contemplated. Non-gall-resistant materials may be gold plated to reduce galling.

The pushing endface 158 of the compression screw 116 includes a flat circumferential surface that is configured to abut and put an axial load on the pushing surface 140 of the tube sleeve 114. Extending from the pushing endface 158 of the compression screw 116 is a counterbore 162 configured to receive and engage with the circumferential seat portion 142. The compression screw 116 further includes threads 164 proximate the pushing endface 158 configured to interface with internal threads of a female receiver fitting, as shown in FIGS. 8-9.

The compression screw 116 includes an end knob 168 having a knurled grip portion 170. The end knob 168 may be of a sufficient circumference and/or radius such that installations may be completed by hand without the use of an installation tool. The knurls are shown to be straight knurls, although other embodiments are contemplated such as diamond or diagonal knurls. While the shown embodiment includes the extended diameter manual tightening end knob 168, other embodiments of aspects of the present invention may employ a typical tool-tightening end instead. For example, it is contemplated that the various embodiments of a seal body, collar and tube assembly consistent with the present disclosure may include either a tool-free or tool-required compression screw 116.

The fitting 100 further includes the inner tube 120 extending between a first end 172 and a second end 174 and having a tube body 176 and a channel 178 extending therethrough. The inner tube 120 may be any length appropriate for a liquid chromatography application. The inner tube 120 may be made of, for example, stainless steel. By way of a specific dimensional example, the inner and outer dimensions of the inner tube 120 may be 0.004 inches and 0.025 inches, respectively. However, various dimensions of the inner tube 120 may be provided depending on the type of liquid chromatography application and the pressures and volume flow rates under which the fitting 100 and inner tube 120 is configured to operate.

FIG. 6 depicts a side cross sectional view of the fitting 100 of FIGS. 4 and 5 in accordance with one embodiment in an assembled state. As shown, the relative position of the compression screw 116 is secured with respect to the tube assembly 114, 120 by the pushing surface 140 and circumferential seat portion 142 on one side, and the retainer ring 118 on the other side. Thus, the compression screw 116 may be axially restrained by these elements 140, 142, 118 relative to the tube assembly 114, 120 while still being capable of axial rotation relative to the tube assembly 114, 120.

Further, the collar 112 is shown secured to each of the seal body 110 and the tube sleeve 114. In one embodiment, the collar 112 may include two circumferential crimps, one located at the thin wall portion 152 for securing the collar 112 to the reduced outer diameter portion 136 and the other located at the thick wall portion 154 for securing the collar 112 to the seal body 110. The two circumferential crimps may be a press fit to retain and secure the seal body 110 within the collar 112. Once secured, the second endface 124 of the seal body 110 is configured to extend past the second end 150 of the collar. The amount that the second endface 124 extends over the second end 150 may vary depending on the application and material properties of the seal body. As shown in FIG. 9, the extended second endface 124 of the seal body 110 may be configured to deform about the second end 150 of the collar 112 when the seal body 110 is under compression and pressed against a sealing surface with an axial load.

FIG. 7 depicts a perspective cutaway view of the fitting 100 of FIGS. 4-6 in accordance with one embodiment prior to attachment of the collar 112 and seal body 110. In particular, FIG. 7 shows the fitting 100 after attachment of the inner tube 120 and the tube sleeve 114 via a welding process. In particular, the inner tube 120 and the tube sleeve 114 may first be aligned at the ends thereof. A circumferential weld 182 may be applied at the endface created by each of the front endface 132 of the tube sleeve 114 and the first end 172 of the inner tube 120. The weld 182 may be particularly located at the endface of the tube assembly 114, 120. Once welded, a polishing, sanding or smoothing process may be employed in order to flatten a polished endface surface 180, as shown. The polished endface 180 provides a flat, smooth and/or uniform sealing surface that is configured to facilitate and improve sealing when the seal body 110 is pressed against the polished endface 180. In one embodiment, the weld 182 may be the only form of attachment between the inner tube 120 and the tube sleeve 114. In other embodiments, one or more additional welds may be located at one or more different axial locations along the inner tube 120 and the tube sleeve 114.

FIG. 8 depicts a side cross sectional view of the fitting 100 of FIGS. 4-7 attached to a receiver 200 before tightening in accordance with one embodiment. FIG. 9 depicts a side cross sectional view of the fitting 100 of FIGS. 4-7 attached to the receiver 200 after tightening in accordance with one embodiment. The receiver 200 may be a female receiver fitting, or any other type of fitting configured to connect, mate or create a fluidic coupling with a male fitting such as the fitting 100. The female receiver 200 is shown including a threaded bore 218 extending from an opening end. A tapered bore 216 extends from the threaded bore 218 deeper into the receiver 200. An inner bore 213 extends from the tapered bore 216 to a sealing surface 214. A channel 210 extends from the sealing surface 214 through which fluid from the fitting 100 is configured to be transported. As shown, the tapered surface 138 of the fitting 100 is shown aligned with the tapered bore 216 of the receiver 200 while the second endface 124 of the seal body 110 abuts the sealing surface 214 of the receiver 200. As shown in FIG. 9, when the seal body 110 is placed under axial compression by the tightening of the compression screw 116 within the female receiver 200, the seal body 110 is configured to deform over the second end 150 of the collar 112, as depicted with an expanded circumferential portion 184.

Methods of manufacturing the fitting 100 are also contemplated in accordance with the shown embodiment and Figures. For example, a method of manufacturing the fitting 100 may include welding a tube sleeve, such as the tube sleeve 114, and an inner tube, such as the inner tube 120, at an endface of each of the tube sleeve and the inner tube, such as the front endface 132 and the first end 172, to create a tube assembly having a welded tube assembly endface, such as the polished surface 180. Method of manufacturing may also include polishing the welded tube assembly endface after the welding of the ends of the tube sleeve and the inner tube. Still further, methods may include abutting a surface of a seal body, such as the seal body 110, to the welded tube assembly endface and securing a collar, such as the collar 112, to an outer surface of the tube sleeve and an outer surface of the seal body. This securing may include, for example, press fitting the collar to each of the outer surface of the tube sleeve and the outer surface of the seal body. The assembly of the fitting in accordance with the method may thereby include maintaining a fluid tight seal between the surface of the seal body and the welded tube assembly endface such that fluid conveyed through the inner tube and an axial opening of the seal does not leak between the tube sleeve, the inner tube, and the collar.

Other methods contemplated include creating a fluidic coupling in a chromatography system such as a liquid chromatography system. Methods may include providing a fitting, such as the fitting 100, and fluidically coupling the fitting to a receiver fitting of a liquid chromatography system by hand tightening a compression screw of the fitting, such as the compression screw 116, without a tightening tool, such as wrench of the like. Methods include maintaining a fluid tight seal between a first endface of a seal body, such as the first endface 122 of the seal body 110, and an endface of a tube assembly, such as the endface 180 of the tube assembly 114, 120. Methods may include conveying fluid through an inner tube, such as the inner tube 120, and an axial opening of the seal body, such as the inner bore 128. Methods may further include avoiding any leaking of the fluid between a tube sleeve, an inner tube, and a collar of the fitting, such as the tube sleeve 114, inner tube 120 and collar 112 of the fitting 100. Methods may include deforming the seal body over an end of the collar when compressed against a surface of a receiver fitting, such as the deformation shown in FIG. 9.

FIG. 10 depicts an exploded perspective view of another exemplary fitting 300 in accordance with one embodiment. FIG. 11 depicts a side cross sectional view of the fitting of FIG. 10 in accordance with one embodiment. Like the fitting 100 the fitting 300 may be deployed in the manner described in FIGS. 1-3 in a liquid chromatography system or any chromatography system. The fitting 300 may be is configured to connect to various liquid chromatography systems, such as 6 kilopounds per square inch (ksi) systems, 10 ksi systems, and/or 20 ksi systems. Similar to the fitting 100, the fitting 300 may be a tool-free fitting that eliminates the need for installation tools and can be sufficiently tightened by hand. The fitting 300 may be configured to eliminate debris from galling during tightening. The fitting 300 may further be configured to eliminate pinch points within a female receiver fitting and minimize seal creep and further eliminate dead volume. The fitting 300 may be configured for multiple installations and tightening sequences without compromising connection integrity. The fitting 300 is shown including a compression screw 310, a push ring 312, a retainer cap 314, a seal body 316 and a tube 318. Unlike the fitting 100, the fitting 300 does not include a tube sleeve, but rather includes only the single tube 318.

The compression screw 310 extends between a front end 320 and a back end 322 and includes a channel 324 extending between the front end 320 and the back end 322. The channel 324 may be configured to receive the tube 318. A reduced diameter portion 326 of the channel 324 may be configured to receive the tube 318 with a clearance fit that allows the tube 318 to slide through the reduced diameter portion 326. The compression screw 310 includes external threads 328 configured to be received by female threads of a female receiver fitting, as shown in in an exemplary embodiment in FIGS. 12 and 13.

The compression screw 310 is a first counterbore 334 extending from the back end 322 having a first circumference. The first counterbore 334 extends to a first seating surface 335. A second counterbore 336 extends from the first counterbore 334 further from the back end 322 having a second circumference that is less than the first circumference. The second counterbore 336 extends to a second seating surface 337. The second counterbore 336 may be configured to receive the push ring 312 with a clearance fit that allows the compression screw 310 to freely rotate about the push ring 312. The first counterbore 334 may be configured to receive a portion of the retainer cap 314 with an interference or press fit attachment so that rotation of the compression screw 310 causes rotation of the retainer cap 314. In other embodiments, the retainer cap 314 may be configured to be welded, adhered or otherwise permanently attached to the end of the compression screw 310.

The compression screw 310 may be made of a gall resistant stainless steel material to prevent galling and prevent debris from being created by the friction between the compression screw 310 and a female receiver fitting, as shown in FIGS. 12-13. However, embodiments contemplated may be made of any metallic material. Materials that are not gall resistant are also contemplated. Non-gall-resistant materials may be gold plated to reduce galling.

The compression screw 310 includes an end knob 330 having a knurled grip portion 332. The end knob 330 may be of a sufficient circumference and/or radius such that installations may be completed by hand without the use of an installation tool. The knurls are shown to be straight knurls, although other embodiments are contemplated such as diamond or diagonal knurls. While the shown embodiment includes the extended diameter manual tightening end knob 330, other embodiments of aspects of the present invention may employ a typical tool-tightening end instead. For example, it is contemplated that the various embodiments of a seal body, collar and tube assembly consistent with the present disclosure may include either a tool-free or tool-required compression screw 310.

The push ring 312 may be made of a stainless steel or other metallic material that can be welded to the outer surface of the tube 318. Prior to attachment, the push ring 312 may include a circular middle opening configured to receive the tube 318. When welded or otherwise attached or fixed to the tube 318, the push ring 312 creates a tube having a greater diameter portion (i.e. the push ring 312) that is configured to be moved or pushed axially with the compression screw 310. The push ring 312 may be dimensioned to fit into the second counterbore 336 of the compression screw 310 with clearance to allow for rotation of the push ring 312 about the compression screw 310. In other embodiments, the push ring 312 may be in integral circumferential protrusion, ridge, or other greater diameter portion of the tube 318 that may similarly fit into the second counter bore 336 of the compression screw 310.

The retainer cap 314 includes a main body 345 having a circumference that covers most or all of the surface area of the back end 322 of the compression screw 310. A retainer cap 314 includes a circumferential extended portion 346 extending from the main body 345 of the retainer cap 314. The circumferential extending portion 346 may a circumference that corresponds to the circumference of the first counterbore 334 of the compression screw 310. The circumferential extending portion 346 is configured to attach to the back end of the compression screw 310 within the first counterbore 334 in a press fit or interference fit arrangement. The circumferential extending portion 346 may further be attached to the compression screw 310 with an adhesive or weld if necessary. Whatever the embodiment, the retainer cap 314 may be configured to rotate with the compression screw 310. The retainer cap 314 further includes a circumferential narrow ring contact portion 348 extending from the circumferential extending portion 346 and configured to make contact with the push ring 312. This contact portion 348 may be configured to retain the push ring 312 firmly in place between the retainer cap 314 and the second seating surface 337 of the second counterbore 336, while still allowing rotation between the push ring 312 and the compression screw 310 and retainer cap 314.

The seal body 316 of the fitting 300 extends between a first endface 352 and a second endface 354. The seal body 316 includes an outer surface and an inner bore 356. The inner bore 356 of the seal body 316 may include an inner diameter in the range between 0.003 inches and 0.020 inches depending on, for example, the inner diameters of the tube 318 and/or a female receiver fitting or the pressure requirement for a given application. The seal body 316 may be made of, for example, a high temperature polyimide or a polyether ether ketone (PEEK) material. The seal body 316 may further be made of a deformable material that is configured to compress under axial stress. However, in higher pressure applications, the seal body 316 may be made from a metallic material, such as Tantalum or Niobium metal. The yield strength of the material of the seal body 316 may be lower than the yield strength of the material of the components of the tube 318. The seal body 316 may be made of a creep resistant material and the seal body 316 may be, when assembled fully constrained by the tube 318 so as to prevent creep and prevent the need for periodic retightening of the fitting 300.

The tube 318 includes a body extending between a first end 356 and a second end 358 and having a channel 360 extending therethrough. The tube 318 may be any length appropriate for a liquid chromatography application. The tube 318 may be made of, for example, stainless steel. By way of a specific dimensional example, the inner and outer dimensions of the tube 318 may be 0.004 inches and 0.025 inches, respectively. However, various dimensions of the tube 318 may be provided depending on the type of liquid chromatography application and the pressures and volume flow rates under which the fitting 300 and tube 318 is configured to operate.

The tube 318 may further include a counterbore 362 extending from the first end 356 to a seating surface 363. The outer surface of the seal body 316 may be dimensioned to fit within the counterbore 362 of the tube 318. In particular, the counterbore 362 may be a narrower or thinner portion of the wall of the tube 318 relative to the rest of the length of the tube 318 that extends from the seating surface 363 toward the first end 356. This narrow or thinner portion may be configured to receive the second endface 354 of the seal body in a press fit, friction fit, or interference fit relationship. When seated in the counterbore 362, the seal body 316 may have a length between its first and second endfaces 352, 354 that is greater than a length of the counterbore 362 such that the seal body 316 extends from the first end 356 of the tube 318.

FIG. 12 depicts a side cross sectional view of the fitting 300 of FIGS. 10-11 attached to the receiver 200 after tightening in accordance with one embodiment. FIG. 13 depicts a side cross sectional view of the fitting 300 of FIGS. 4-7 attached to the receiver 200 after tightening in accordance with one embodiment. While the fitting 300 may be configured to attached to the same type of receiver as the fitting 100 described above, the fittings 100, 300 may be dimensioned to create fluidic couplings with various female receiver fittings. As shown, a tapered surface 329 of the fitting 300 is shown aligned with the tapered bore 216 of the receiver 200 while the second endface 352 of the seal body 316 abuts the sealing surface 214 of the receiver 200. The outer threads 328 of the compression screw 310 are engaged with the threads 218 of the receiver fitting 200. As shown in FIG. 13, when the seal body 316 is placed under axial compression by the tightening of the compression screw 310 within the female receiver 200 via engagement of the threads 328, 218. This tightening creates an axial compression on the seal body 316, which is configured to deform over the first end 356 of the tube 318, as depicted with an expanded circumferential portion 365.

Methods of fluidic coupling using a fitting such as the fitting 300 are contemplated. For example, methods may include providing a fitting, such as the fitting 300. Methods may include fluidically coupling the fitting to a receiver fitting, such as the receiver 200, of a liquid chromatography system by hand tightening the compression screw without a tightening tool. Methods may include maintaining a fluid tight seal between the first endface of the seal body and the seating surface of the tube assembly and conveying fluid through the inner tube and an axial opening of the seal. Methods may include deforming the seal body over the front end of the tube when compressed against a surface of a receiver fitting and passing a fluid through the tube, the seal body and the receiver fitting.

While the invention has been shown and described with reference to specific embodiments, it should be understood by those skilled in the art that various changes in form and detail may be made therein without departing from the spirit and scope of the invention as recited in the accompanying claims. For example, in some embodiments, the removable seal device may not include a support sleeve, or may include a support sleeve that is not made of a metallic material. Other variations are contemplated without departing from the scope of inventions described herein.

What is claimed is:

1. A method of manufacturing a fitting for fluidic coupling in a chromatography system comprising:
   welding a tube sleeve and an inner tube at an endface of each of the tube sleeve and the inner tube to create a tube assembly having a welded tube assembly endface, wherein the tube sleeve includes a reduced outer diameter portion having a continuous outer diameter extending axially from the endface;
   polishing the welded tube assembly endface, wherein the welded tube assembly endface is a sealing surface configured to seal with a seal body;
   abutting a surface of the seal body to the welded tube assembly endface; and
   securing a collar to the reduced outer diameter portion of the tube sleeve and an outer surface of the seal body.

2. The method of claim 1, wherein the securing the collar further includes press fitting the collar to each of the reduced outer diameter portion of the tube sleeve and the outer surface of the seal body.

3. The method of claim 2, further comprising maintaining a fluid tight seal between the surface of the seal body and the welded tube assembly endface such that fluid conveyed through the inner tube and an axial opening of the seal body does not leak between the tube sleeve, the inner tube, and the collar.

4. The method of claim 2, further comprising press fitting a portion of the collar over the reduced outer diameter portion of the tube sleeve.

5. The method of claim 4, wherein the collar includes a thin wall portion extending from a first end, and a thick wall portion extending from the thin wall portion to a second end, wherein a circumferential interior ridge is defined by a difference in thickness between the thin wall portion and the thick wall portion, wherein the circumferential interior ridge defines a surface that contacts the welded tube assembly endface.

6. The method of claim 4, further comprising crimping at least one circumferential crimp in the collar to secure the collar to the reduced outer diameter portion of the tube sleeve.

7. The method of claim 6, further comprising crimping two circumferential crimps in the collar to secure the collar the reduced outer diameter portion of the tube sleeve.

8. The method of claim 1, wherein the tube sleeve includes the reduced outer diameter portion having the continuous outer diameter extending axially from the endface.

9. The method of claim 1, further comprising securing the collar to the seal body that extends between a first seal body endface and a second seal body endface such that the first seal body endface abuts the endface of the welded tube assembly endface.

10. The method of claim 9, further comprising making the seal body from at least one of a high temperature polyimide and polyether ether ketone.

11. The method of claim 1, wherein the welding the tube sleeve and the inner tube at the endface of each of the tube sleeve and the inner tube to create the tube assembly having a welded tube assembly endface includes creating a circumferential weld at the welded tube assembly endface.

12. The method of claim 1, further comprising:
   aligning the endface of each of the tube sleeve and the inner tube prior to the welding.

13. The method of claim 1, wherein the polishing further includes sanding the endface.

14. The method of claim 1, wherein the polishing provides a uniform sealing surface at the welded tube assembly endface to facilitate sealing when the seal body abuts the welded tube assembly endface.

15. The method of claim 1, wherein the seal body is metallic.

16. The method of claim 1, wherein the seal body is made of a deformable material.

17. The method of claim 1, wherein the securing the collar further includes press fitting the collar to the reduced outer diameter portion of the tube sleeve.

18. The method of claim 1, wherein the securing the collar further includes press fitting the collar to the outer surface of the seal body.

19. A method of manufacturing a fitting for fluidic coupling in a chromatography system comprising:
   providing:

a compression screw including an axial bore, a threaded portion, and a drive end;

a tube assembly including a tube sleeve and an inner tube disposed through the tube sleeve, the tube sleeve and the inner tube each extending to an endface of the tube assembly, the tube sleeve including a reduced outer diameter portion having a continuous outer diameter extending axially from the endface;

a seal body extending between a first endface and a second endface, the seal body including an outer surface; and a collar;

welding the tube sleeve and the inner tube at the endface of each of the tube sleeve and the inner tube to create a tube assembly having a welded tube assembly endface;

abutting the first endface of the seal body to the welded tube assembly endface; and securing the collar to the reduced outer diameter portion of the tube sleeve and the outer surface of the seal body.

20. The method of claim 19, further comprising press fitting the collar over the reduced outer diameter portion of the tube sleeve.

\* \* \* \* \*